US009865263B2

(12) United States Patent
Hon-Anderson

(10) Patent No.: US 9,865,263 B2
(45) Date of Patent: *Jan. 9, 2018

(54) REAL-TIME VOICE RECOGNITION ON A HANDHELD DEVICE

(75) Inventor: Eric Hon-Anderson, Bedford, MA (US)

(73) Assignee: Nuance Communications, Inc., Burlington, MA (US)

( * ) Notice: Subject to any disclaimer, the term of this patent is extended or adjusted under 35 U.S.C. 154(b) by 1171 days.

This patent is subject to a terminal disclaimer.

(21) Appl. No.: 12/892,299

(22) Filed: Sep. 28, 2010

(65) Prior Publication Data

US 2011/0131291 A1    Jun. 2, 2011

Related U.S. Application Data

(60) Provisional application No. 61/265,590, filed on Dec. 1, 2009.

(51) Int. Cl.
*G10L 15/30* (2013.01)

(52) U.S. Cl.
CPC ..................................... *G10L 15/30* (2013.01)

(58) Field of Classification Search
None
See application file for complete search history.

(56) References Cited

U.S. PATENT DOCUMENTS

| 6,434,524 | B1 | 8/2002 | Weber |
| 6,944,474 | B2 | 9/2005 | Rader et al. |
| 7,027,842 | B2 * | 4/2006 | Zhang .................. H04M 1/271 455/557 |
| 7,143,033 | B2 | 11/2006 | Beleger et al. |
| 7,925,304 | B1 | 4/2011 | Gailoux et al. |
| 7,957,975 | B2 * | 6/2011 | Burns et al. .................. 704/275 |

(Continued)

OTHER PUBLICATIONS

[No Author Listed] Three ways to make your mobile life easier, Jott Networks Inc., 3 pages, http://web.arch.org/web/20090828162258/http://jott.com/jott/jott-for-iphone.html [Last accessed on Apr. 17, 2015 purportedly archived on Aug. 28, 2009].
European Search Report for EP Patent Application No. 10193227.5, dated Mar. 2, 2011.

*Primary Examiner* — Khaled Kassim
(74) *Attorney, Agent, or Firm* — Wolf, Greenfield & Sacks, P.C.

(57) ABSTRACT

A method and apparatus for implementation of real-time speech recognition using a handheld computing apparatus are provided. The handheld computing apparatus receives an audio signal, such as a user's voice. The handheld computing apparatus ultimately transmits the voice data to a remote or distal computing device with greater processing power and operating a speech recognition software application, the speech recognition software application processes the signal and outputs a set of instructions for implementation either by the computing device or the handheld apparatus. The instructions can include a variety of items including instructing the presentation of a textual representation of dictation, or a function or command to be executed by the handheld device (such as linking to a website, opening a file, cutting, pasting, saving, or other file menu type functionalities), or by the computing device itself.

19 Claims, 3 Drawing Sheets

(56) References Cited

U.S. PATENT DOCUMENTS

| | | |
|---|---|---|
| 8,160,495 B2 | 4/2012 | Khedouri et al. |
| 8,315,878 B1* | 11/2012 | Burns et al. .................. 704/275 |
| 9,009,003 B1 | 4/2015 | Chan et al. |
| 2002/0178003 A1 | 11/2002 | Gehrke et al. |
| 2002/0191754 A1* | 12/2002 | Liu ....................... H04M 1/271 |
| | | 379/88.01 |
| 2004/0203768 A1 | 10/2004 | Ylitalo et al. |
| 2006/0190265 A1 | 8/2006 | Kurganov et al. |
| 2007/0082668 A1 | 4/2007 | Silver et al. |
| 2007/0208563 A1* | 9/2007 | Rothschild ................... 704/235 |
| 2008/0037727 A1* | 2/2008 | Sivertsen et al. .......... 379/88.13 |
| 2008/0064371 A1 | 3/2008 | Madhavapeddi et al. |
| 2008/0097851 A1 | 4/2008 | Bemmel et al. |
| 2008/0162133 A1* | 7/2008 | Couper et al. ................ 704/239 |
| 2008/0300886 A1* | 12/2008 | Patch ........................... 704/275 |
| 2009/0030687 A1* | 1/2009 | Cerra et al. ................... 704/243 |
| 2009/0030696 A1* | 1/2009 | Cerra et al. ................... 704/275 |
| 2009/0052635 A1 | 2/2009 | Jones et al. |
| 2009/0117945 A1* | 5/2009 | Mahler et al. ............. 455/569.1 |
| 2009/0315867 A1 | 12/2009 | Sakamoto et al. |
| 2010/0279652 A1* | 11/2010 | Sharp .................... G06F 9/4843 |
| | | 455/410 |
| 2010/0333163 A1* | 12/2010 | Daly .................... H04N 5/4403 |
| | | 725/133 |
| 2011/0161075 A1* | 6/2011 | Hon-Anderson ............ 704/201 |
| 2012/0284027 A1* | 11/2012 | Mallett et al. ................ 704/246 |
| 2012/0330661 A1* | 12/2012 | Lindahl ........................ 704/235 |
| 2013/0090928 A1* | 4/2013 | Rose et al. ................... 704/249 |
| 2014/0163995 A1* | 6/2014 | Burns et al. .................. 704/275 |

* cited by examiner

REAL-TIME VOICE RECOGNITION ON A HANDHELD DEVICE

CROSS-REFERENCE TO RELATED APPLICATIONS

This application claims, under 35 U.S.C. §119(e), priority to and the benefit of the filing date of U.S. Provisional Patent Application No. 61/265,590, filed on Dec. 1, 2009, which is herein incorporated by reference in its entirety.

FIELD OF THE INVENTION

The present invention relates to a real-time voice recognition system suitable for use with a handheld device, and more particularly to a voice recognition system that makes use of the processing power of a computer in a distributed location from the handheld device to implement voice recognition capabilities on the handheld device.

BACKGROUND OF THE INVENTION

Speech recognition and voice processing systems are known for translation of dictated speech into text or computer instructions (such as menu operations, and the like). Conventional speech recognition systems use a number of different algorithms and technologies in a perennial effort to recognize a user's speech and do what the user desires based on that speech recognition. A common application of this technology is in the classic dictation sense where voice is converted into text in a word processing application. Another application is conversion of voice into common instructions for menu operations, such as open a file, close a file, save a file, copy, paste, etc.

In most systems, there is a computing device with memory, storage, and a processor, that executes a software application enabling the speech recognition functionality. A user speaks into a microphone and the speech recognition software processes the user's voice into text or commands.

There are several performance factors that are considered when assessing these speech recognition applications. Among the factors are speed and accuracy. The users of such applications desire that the applications interpret the user's voice as are understood. Likewise, the users of such applications also benefit from the applications providing feedback in real-time, so that the user knows as quickly as possible what the application heard and what it is doing in response to the voice input, or commands are acted on quickly.

The process of speech recognition is computationally intense, and requires substantial processing resources. There are varying levels of known algorithms and methods that make tradeoffs between processing power required, and accuracy and speed of translation. Generally, the more accurate speech recognition applications provide the fastest speech recognition results with use of more powerful processing resources. Likewise, when more powerful processing resources are not available, the speech recognition applications must carry out fewer processes and therefore have reduced accuracy, and/or reduced processing speeds.

Example processing systems that are presently obligated to make some sacrifices in quality and/or speed (when compared with desktop or server computers) are systems that can be found in handheld devices, including personal digital assistants (PDAs), smart phones, palmtop devices, and other pocket sized devices capable of executing software applications. As such, present speech recognition capabilities on such pocket devices are more limited than the capabilities presently found on desktop or server computers. There is simply insufficient processing power with present technology, and the algorithms for speech recognition are too complex, for handheld devices to perform at the same level as computers with more physical presence.

SUMMARY

There is a need for a handheld or pocket computing apparatus capable of speech recognition functionality with the same or similar speed and accuracy presently available on desktop or server computers. The present invention is directed toward further solutions to address this need, in addition to having other desirable characteristics.

The present invention leverages a connection between software application operating on a desktop or server computer and a software application operating on a handheld device in such a way as to enable sending status information therebetween, as well as audio and command information to allow a user to dictate on, or control, the desktop or server computer remotely, or to dictate on, or control, the handheld device, with the speed and accuracy of the desktop or server computer and in real-time.

In accordance with one aspect of the present invention, a method for implementation of real-time audio recognition includes receiving an audio signal at a handheld computing apparatus. The handheld computing apparatus converts, in real-time, the audio signal into audio digital data representing the audio signal. The audio digital data is transmitted, in real-time, from the handheld computing apparatus to a computing device separately situated from the handheld computing apparatus. A set of computer readable instructions are received in real-time at the handheld computing apparatus from the computing device. The handheld computing apparatus executes the computer readable set of instructions in real-time.

In accordance with further aspects of the present invention, the handheld computing apparatus can be a wireless mobile device. The audio signal can be a user's voice. The step of transmitting the audio digital data can include the handheld computing apparatus wirelessly transmitting the audio digital data. The step of transmitting the audio digital data can include the handheld computing apparatus wirelessly transmitting the audio digital data using a cellular network or a wireless local area network. The step of executing the set of instructions can result in communication of a status to the handheld computing apparatus of the handheld computing apparatus, of the computing device, or of a task, communication of information to the handheld computing apparatus, modification of one or more settings on the handheld computing apparatus, implementation of an editing function on the handheld computing apparatus, and/or implementation of a navigation function on the handheld computing apparatus. Furthermore, the step of executing the set of instructions can result in execution of a task on the handheld computing apparatus, the task being one or more operation of the list of operations comprising editing, sending, deleting, opening, saving, selecting, copying, pasting, or moving text or a message. Execution of the set of instructions can further include modification of a view in a display on the handheld computing apparatus, displaying alternative options to a user of the handheld device, or the handheld device navigating to a predetermined address or location.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
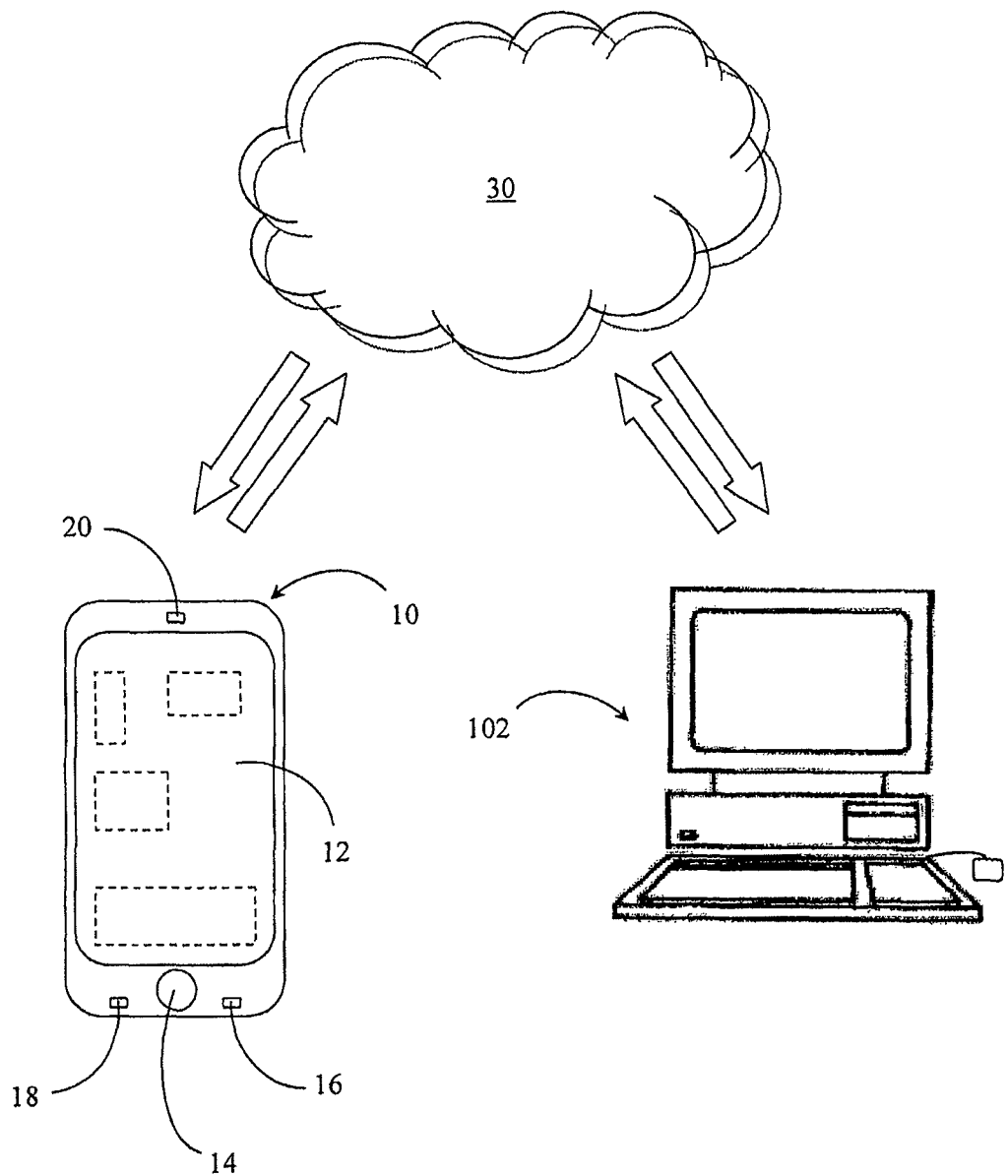
FIG. 1 is a diagrammatic illustration of a handheld computing apparatus and a computing device, according to one embodiment of the present invention.

An illustrative embodiment of the present invention relates to a system and method for implementation of real-time audio recognition using a handheld computing apparatus. The handheld computing apparatus receives an audio signal, such as a user's voice. The handheld computing apparatus does a real-time conversion of the audio into a digital data format. The digital data is then transmitted from the handheld device to a computing device separately situated from the handheld computing apparatus. The computing device has more processing power than the handheld device, and operates a speech recognition software application. The computing device processes the audio data, and sends back a set of computer readable instructions to the handheld computing apparatus. These instructions can take a number of different forms, including instructing the presentation of a textual representation of dictation, or a function or command to be executed by the handheld device (such as linking to a website, opening a file, cutting, pasting, saving, or other file menu type functionalities). The handheld computing apparatus then acts on the instructions, for example, displaying the dictated text, composing an email, navigating to a website, launching a program, and the like. As a result of the present invention, the user can take advantage of the freedom and portability of the handheld device, while having access to the processing power to implement the best speed and accuracy available in speech recognition technology for desktop and server computers. The user may, alternatively, remotely control the interaction with the computing device, using the handheld computing apparatus. This embodiment does not require that the set of instructions return to the handheld device for execution, but instead that they be executed by the computing device.

As utilized herein, the term "handheld" refers in all instances to mobile devices, cellular telephones, handheld computers, palm top devices, pocket-sized computing devices, smartphones, personal digital assistants (PDAs), enterprise digital assistants, or the like. The handheld device or computing apparatus typically includes a display screen in some instances with touch input, and possibly an additional miniature keyboard or keypad. The handheld device or computing apparatus typically includes a processor, a memory component, and a storage device, as well as numerous buttons, a microphone, a headphone, and in some instances a speaker.

The intake of the audio, conversion to data format, transmission, processing, generation of instructions, transmission of instructions, and subsequent actions, all occur real-time. This means that a user can dictate into their handheld device, and using the processing power of the desktop or server in communication with the handheld, receive back the typed text in real-time, as though the user was dictating directly to the desktop or server. Likewise, the user can provide verbal instructions or commands to be implemented on the handheld device. The speech is forwarded to the remote desktop or server and instructions are returned for execution by the handheld device.

Figure 2:
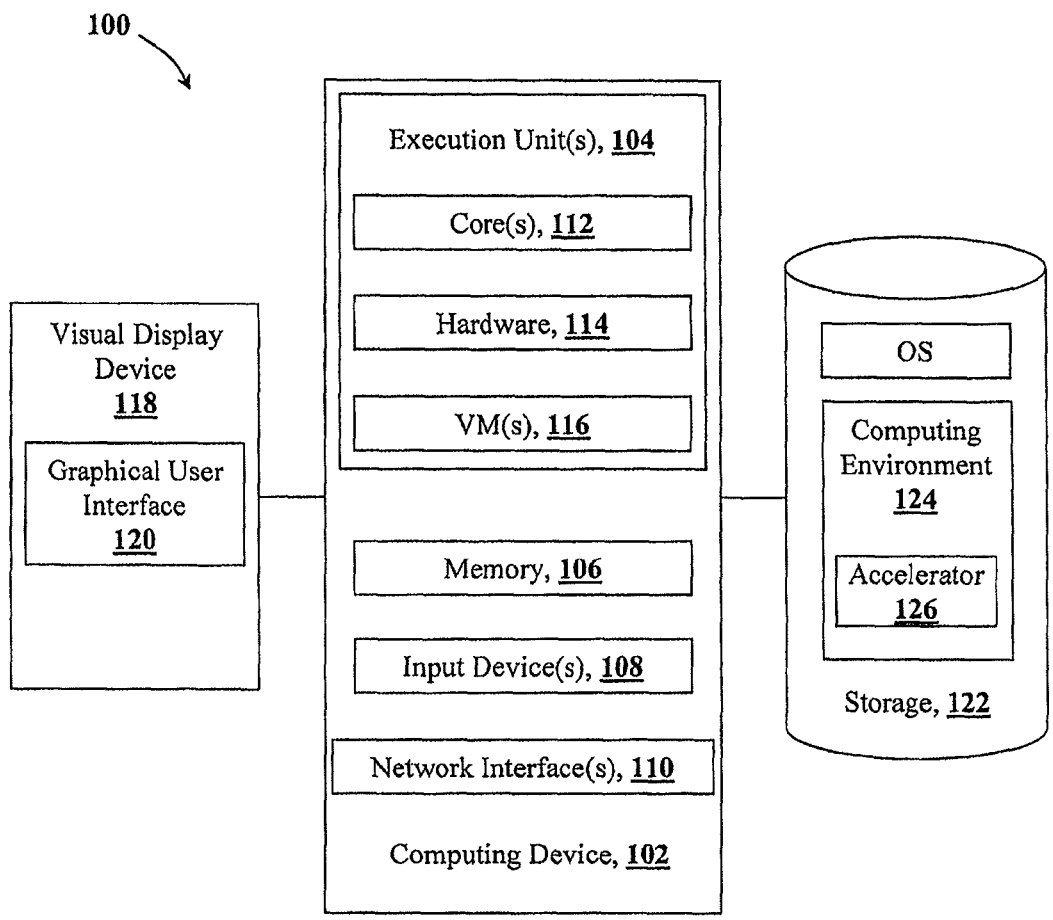
FIG. 2 is a diagrammatic illustration of the computing device of FIG. 1, according to one embodiment of the present invention.
Figure 3:
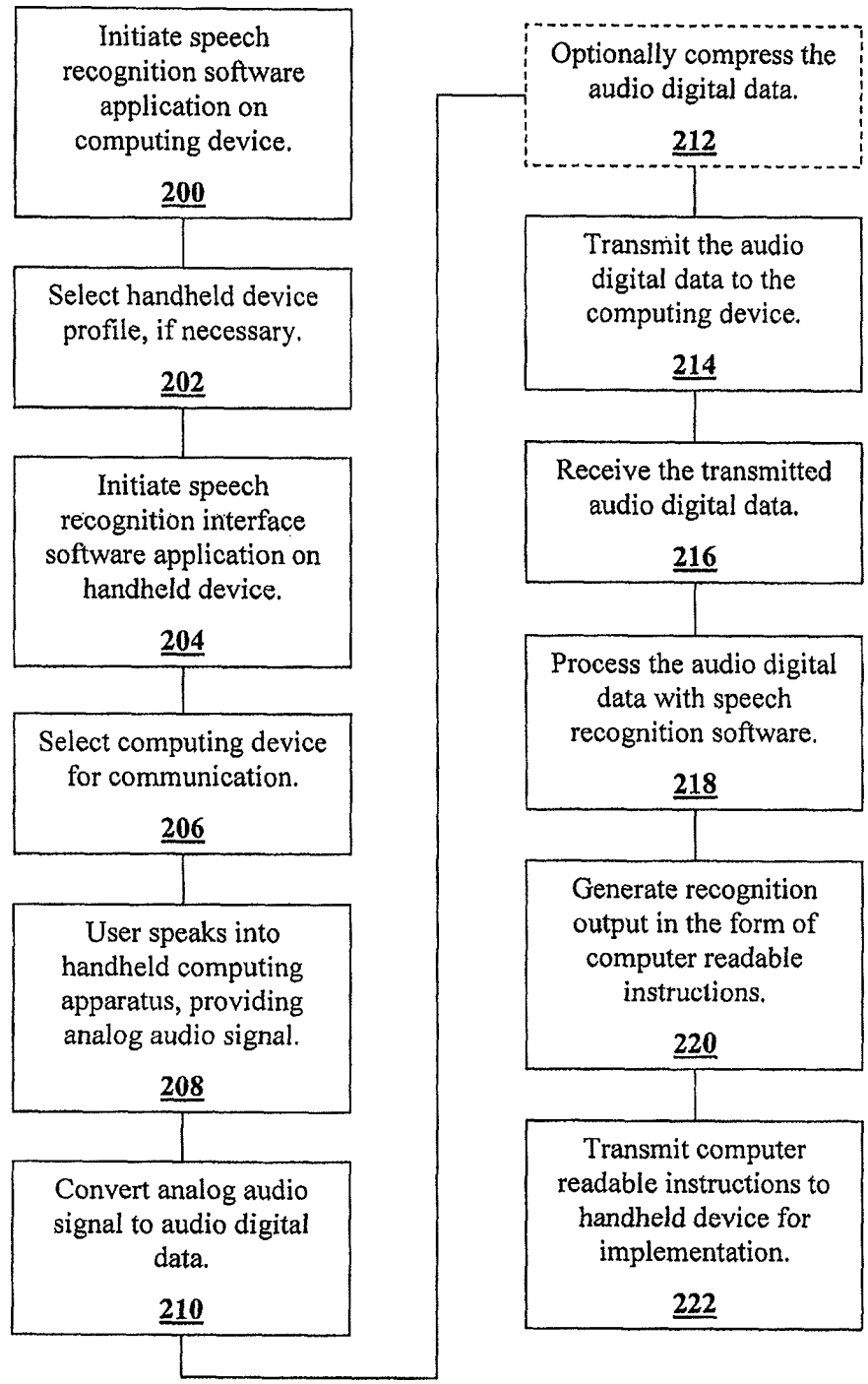
FIG. 3 is a flowchart depicting a method of implementing real-time speech recognition using a handheld computing apparatus, according to one aspect of the present invention.

FIGS. 1 through 3, wherein like parts are designated by like reference numerals throughout, illustrate an example embodiment of a system and method for implementation of real-time voice or speech recognition on a handheld device according to the present invention. Although the present invention will be described with reference to the example embodiment illustrated in the figures, it should be understood that many alternative forms can embody the present invention. One of ordinary skill in the art will additionally appreciate different ways to alter the parameters of the embodiments disclosed in a manner still in keeping with the spirit and scope of the present invention.

FIG. 1 is a diagrammatic representation of a handheld computing apparatus 10. The handheld computing apparatus 10, in accordance with one example embodiment of the present invention, includes a screen 12 for displaying information in various formats, at least one control button 14, a microphone 16, a speaker 18, and a headphone 20. For purposes of the present invention, not all of the above components are required. At a minimum, the handheld computing apparatus 10 should include the display 12 and the microphone 18 (or possibly a headset with a microphone), so that a user can dictate into the microphone 18 and see the text on the display 12 as described herein.

Internal components of the handheld computing apparatus 10 are also shown, and are representative of conventional internal components for such devices. Specifically, a processor 22, storage component 24, memory component 26, and battery 28 are shown in hidden line because they are internal to the device. Other electronic components required for operation of the handheld computing apparatus 10 are likewise included, but are not specifically described herein as they are known by those of ordinary skill in the art.

The handheld computing apparatus 10 is additionally capable of electronic communication with other devices. Such communication can occur through a hardwire connection, a network connection, or a wireless connection, including a cellular or WiFi connection, and as such further includes at least one internal antenna and/or input/output jack (not shown).

One of ordinary skill in the art will appreciate that the handheld computing apparatus 10 can take many different forms, and is thus not limited by the particular description and illustration herein. Rather, the handheld computer apparatus 10 can have many different equivalent structures. As such, the present invention is by no means limited by the particular example embodiments described and depicted herein, but includes all reasonable equivalents having the necessary functionality to implement the method of the present invention.

The handheld computing apparatus 10 has operating thereon a software application that enables the handheld computing apparatus 10 to communicate with a computing environment 100 separately situated from the handheld computing apparatus 10. For ease of explanation, the term "computing device" will be utilized herein to describe a desktop or server computer having known characteristics of such devices. Specifically, these devices are representative of computers that consumers would have ready access to, and that include hardware and software of a conventional nature. FIG. 2 depicts a computing environment 100 suitable for practicing exemplary embodiments of the present invention. The computing environment 100 includes the computing device 102, which may include execution units 104, memory 106, input device(s) 108, and network interface(s) 110. The execution units 104 may include hardware or software based logic to execute instructions on behalf of the computing device 102. For example, depending on specific implementation requirements, execution units 104 may include: one or more processors, such as a microprocessor; single or multiple cores 112 for executing software stored in the memory 106, or other programs for controlling the computing device 102; hardware 114, such as a digital signal processor (DSP), a graphics processing unit (GPU), a field programmable gate array (FPGA), an application specific integrated circuit (ASIC), etc., on which at least a part of applications can be executed; and/or a virtual machine (VM) 116 for executing the code loaded in the memory 106 (multiple VMs 116 may be resident on a single execution unit 104).

Depending on specific implementation requirements, the memory 106 may include a computer system memory or random access memory (RAM), such as dynamic RAM (DRAM), static RAM (SRAM), extended data out RAM (EDO RAM), etc. The memory 106 may include other types of memory as well, or combinations thereof. A user may interact with the computing device 102 through a visual display device 118, such as a computer monitor, which may include a graphical user interface (GUI) 120. The computing device 102 may include other I/O devices, such as a keyboard, and a pointing device (for example, a mouse) for receiving input from a user. Optionally, the keyboard and the pointing device may be connected to the visual display device 118. The computing device 102 may include other suitable conventional I/O peripherals. Moreover, depending on particular implementation requirements of the present invention, the computing device 102 may be any computer system such as a workstation, desktop computer, server, laptop, handheld computer or other appropriate form of computing or telecommunications device that is capable of communication and that has sufficient processor power and memory capacity to perform the operations described herein.

Additionally, the computing device 102 may include interfaces, such as the network interface 110, to interface to a Local Area Network (LAN), Wide Area Network (WAN), a cellular network, the Internet, or another network, through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), synchronous transfer mode (STM), wireless connections (e.g., 802.11), high-speed interconnects (e.g., InfiniBand, gigabit Ethernet, Myrinet) or some combination of any or all of the above as appropriate for a particular embodiment of the present invention. The network interface 110 may include a built-in network adapter, network interface card, personal computer memory card international association (PCMCIA) network card, card bus network adapter, wireless network adapter, universal serial bus (USB) network adapter, modem or any other device suitable for interfacing the computing device 102 to any type of network capable of communication and performing the operations described herein.

The computing device 102 may further include a storage device 122, such as a hard-drive, flash-drive, or CD-ROM, for storing an operating system (OS) and for storing application software programs, such as the computing application or environment 124. The computing environment 124 may run on any operating system such as any of the versions of the conventional operating systems, any embedded operating system, any real-time operating system, any open source operating system, any proprietary operating system, any operating systems for mobile computing devices, or any other operating system capable of running on the computing device and performing the operations described herein. Furthermore, the operating system and the computing environment 124 may in some instances be run from a bootable CD. The computing environment 124 may include an accelerator 126 that enables a computing application or computing environment 120 to compute one or more elementwise expressions in parallel.

One of ordinary skill in the art will appreciate that the above description concerning the computing environment 100 and computing device 102 is intended to encompass all conventional computing systems suitable for carrying out methods of the present invention. As such, any variations or equivalents thereof that are likewise suitable for carrying out the methods of the present invention are likewise intended to be included in the computing environment 100 described herein. Furthermore, to the extent there are any specific embodiments or variations on the computing environment 100 that are not suitable for, or would make inoperable, the implementation of the present invention, such embodiments or variations are not intended for use with the present invention.

The computing device 102 may run software applications, including voice or speech recognition software applications, such as, for example, MacSpeech® Dictate speech recognition software. Other speech recognition software applications can operate on the computing device 102, as would be understood by those of ordinary skill in the art. As such, the present invention is not limited to use only the applications named herein as illustrative examples.

The handheld computing apparatus 10 likewise must operate a speech recognition interface software application as provided by the present invention. The speech recognition interface software application resides on the handheld device 10. The speech recognition interface software application enables communication from the handheld device 10 with the speech recognition software application operating on the computing device 102. However, the speech recognition interface software application merely serves as an interface, not as a speech recognition engine. As such, the speech recognition interface software application does not require the processing power of a speech recognition engine or software application.

Both the handheld computing apparatus 10 and the computing device 102 are able to electronically communicate with each other. In accordance with one example embodiment of the present invention, the handheld computing apparatus 10 communicates with the computing device wirelessly through a network 30, such as, for example, the Internet. FIG. 1 illustrates the communication between the handheld computing apparatus 10, the network 30, and the computing device 102. The network 30 can take many different forms, including but not limited to a local area network (LAN), a metro area network (MAN), a wide area network (WAN), a WiFi network, the Internet, optical fiber, Ethernet, wireless or wired networks, cellular network, HomePNA, power line communication, G.hn, and the like, such that the present invention is not limited to the particular embodiments described herein.

Other conventional software applications in addition to the speech recognition software application may be required for implementation of the present invention. For example, network communications software that controls the opening of a listening network port, software providing a discovery service protocol (such as Bonjour), and the like, should be understood by those of ordinary skill in the art. As such, details of their specific operation will not be discussed herein.

In accordance with one example embodiment of the present invention, and looking at FIG. 3, a method of implementation of the present invention includes a user opening a speech recognition software application, e.g., MacSpeech® Dictate, on the computing device 102 (step 200), and selects a profile within the software application that has an audio source of the handheld device 10, e.g., an iPhone (step 202). Various profiles can be established within the speech recognition software application to make selection of different modes and devices possible, as is known by those of ordinary skill in the art. Once the computing device 102 and the speech recognition application are operating, the user may leave the computing device 102 with the handheld device 10, or stay, so long as the handheld device 10 maintains the capability for electronic communication with the computing device 102 (i.e., maintains connection if hardwired, or maintains a signal if wireless).

In accordance with the example embodiment of the present invention, the handheld device 10 is on a network that can locate the computing device 102 using a discovery protocol, e.g., Bonjour. The user initiates the speech recognition interface software application on the handheld device 10 (204). The interface software application enables user to select the computing device 102 from a list of available device profiles in a similar manner to how the user previously selected the handheld device profile in the speech recognition software application. The user selects the computing device 102 (step 206). The user may then speak into the microphone 18 of the handheld computing apparatus 10, thus providing an analog audio signal to the handheld computing apparatus 10 (step 208).

The handheld computing apparatus 10 takes the analog audio signal and converts it into audio digital data (step 210). In accordance with one example embodiment of the present invention, the analog signal is sampled to produce a digital stream by the handheld computing apparatus 10. This digital stream is the sequence of amplitudes of the analog signal measured at different times, for example, every $1/11,025$th of a second.

The audio digital data is then segmented into pieces of a predetermined length and compressed (step 212). The compression is a lossless compression, meaning that the exact original segment can be reconstructed from the compressed version. In accordance with an alternative embodiment of the present invention, a lossy compression may be implemented if the connection between devices is too slow for a lossless compression. In a further alternative embodiment, the audio digital data does not need to be compressed at all. The audio digital data (compressed or not) is then transmitted from the handheld computing apparatus 10 to the computing device 102 via the network 30 or other electronic communication (step 214).

In addition to the audio digital data, other digital data may be transmitted from the handheld computing apparatus 10 to the computing device, such as data that indicates status, commands, or other functionality, including data that informs the computing device 102 that the user has pressed a particular button on the handheld computing apparatus 10.

The computing device 102 receives the incoming audio digital data (or other digital data) (step 216). The computing device 102 treats the incoming audio digital data as it would treat audio digital data from any other source that may be coupled directly with the computing device 102. Specifically, the audio digital data is passed to the speech engine of the speech recognition software application and processed by the software application (step 218). The computing device 102 generates recognition output from the speech recognition software application in the form of computer readable instructions (step 220). These instructions include an indication of whether the computing device 102 must implement a particular task itself, or whether the computing device 102 must transmit the instructions back to the handheld computing apparatus 10 for implementation. The computer readable instructions are then transmitted to the handheld computing apparatus 10 (step 222) for implementation.

The above process is implemented by the speech recognition software application having an additional command set optionally added to the list of possible commands, which correlates to actions that may be carried out by the computing device 102 instead of by the handheld computing apparatus 10. In addition, the speech recognition software application includes a software object, to which information such as dictation text may be sent, and which then sends the dictated text to the speech recognition interface software on the handheld device 10 instead of to the screen of the computing device 102. The additional command set includes user-specifiable trigger phrases and user-specifiable URL-based commands or computer readable instructions that are sent to the handheld computing apparatus 10 when recognized. The URLs may cause a variety of actions to occur on the handheld computing apparatus 10, including but not limited to, causing a web browser to open and display a web page, a mail application to open and create a message, or a telephone functionality to place a call to an entry in an address book. Sending dictation to the handheld computing apparatus 10 allows the creation of short documents, including multi part documents like an email message, which may contain addresses, a subject, and a body. In the event of misrecognitions, a set of alternative recognitions is sent to the handheld computing apparatus 10, and a message may be sent back to the computing device 102 to cause it to replace the misrecognition with a preferred alternative.

Status information roughly equivalent to the information typically displayed in a status window on the computing device 102 may be displayed on the handheld computing apparatus 10, to alert the user to modes and targets. The user may interact by touch with the controls present on the screen 12, or by speech, to perform most of the speech functions typically performed with speech or other input device on the computing device 102. The user may also create new documents, including multi-part documents like email messages, place phone calls, or trigger the commands set up earlier. When done, the user can exit from the speech recognition interface software application (step 216), and may reopen it later, to find the computing device 102 in the same state as it was at the end of the previous session, if desired. Status information, including the mode in which the computing device 102 is currently operating (dictation, spelling, command, sleep, or off states), the current "target" (recipient of any possible dictated text), selected user profile, the text of the most recent recognition, and the like, is sent from the computing device 102 to the handheld computing apparatus 10, and displayed, as desired.

Some example data than can be transferred from the computing device 102 to the handheld device 10, and the corresponding actions, are as follows. A numeric code, followed by some text, means "this is my dictation/commands/spelling state." A different numeric code, followed by 1, 2, or 3 means "this is the state of the microphone, on, off, or asleep." A different numeric code, followed by a number with multiple fields, tells the capitalization, spacing, and numeric states. A different numeric code, followed by some text, means the text is the last phrase that was just recognized. A different numeric code, followed by some text, means the text is the contents of the document. A different numeric code, followed by some text, means the text is name of the current profile. A different numeric code, followed by some text, means the text is name of the currently-active window. A different numeric code, followed by some text, means the text is name of the currently-active field. A different numeric code tells the handheld computing apparatus to actually implement one or more tasks. A different numeric code, followed by a number, means set the microphone's gain to that number. A different numeric code, followed by two numbers and some text, means replace the text specified by that numeric range in the current document with the new text. A different numeric code, followed by two numbers, means select that numeric range in the current document. A different numeric code, followed by two numbers, means scroll to the text specified by that numeric range in the current document. A different numeric code, followed by a 1 or 0, means turn the correction list display on or off. A different numeric code, followed by several segments of text, means that the text is the current list of alternative recognitions from which a user may choose an alternative. A different numeric code, followed by a URL means go to that URL, including web pages, placing phone calls, sending mail, and other inter-application commands. A different numeric code means "send the mail you've been working on." It should be noted that these are merely representative of the codes and correlating actions that can result with implementation of the present invention. The present invention is by no means limited to these specific examples, but instead includes all equivalents and other actions which those of ordinary skill in the art will appreciate could be implemented using the system and method of the present invention as described herein.

It is important to note that all of the above-described steps of the present invention are executed or implemented in real-time. The intake of the audio signal, conversion to digital data, transmission, processing by speech recognition software, return of computer readable instructions, and corresponding implementation of instructions by the handheld computing apparatus or the computing device (depending on the instructions) is all carried out in real-time. This enables the live, real-time, dictation conversion to text and display. This likewise enables the live, real-time, voice command and resulting action implementation. In contrast to known technologies that may receive a voice signal at a handheld apparatus and convert it to a text file that is later emailed or sent back to the phone upon completion, the present invention enables a user to receive feedback in real-time as to what the speech recognition software application understood and then did in response to the user speaking into their handheld computing apparatus.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved.

What is claimed is:

1. A method for implementation of voice command recognition, comprising acts of:
   receiving, at a computing device, from a handheld computing apparatus, audio digital data representing an audio signal received at the handheld computing apparatus, wherein the handheld computing apparatus is separately situated from the computing device;
   performing, by the computing device, voice command recognition processing on the audio digital data received from the handheld computing apparatus to match the audio digital data to a voice command from a plurality of possible voice commands, wherein the plurality of possible voice commands comprises a first plurality of voice commands correlating to computing device actions and a second plurality of voice commands correlating to handheld computing apparatus actions;
   determining, by the computing device, whether a voice command recognized by the computing device from the audio digital data correlates to a computing device action or a handheld computing apparatus action;
   in response to determining that the voice command correlates to a handheld computing apparatus action, transmitting, from the computing device, to the handheld computing apparatus, via at least one network, a set of computer readable instructions indicative of the voice command recognized from the audio digital data by the computing device, wherein the set of computer readable instructions is different from a transcription of the audio digital data; and
   in response to determining that the voice command correlates to a computing device action, executing, by the computing device, the set of computer readable instructions.

2. The method of claim 1, wherein the handheld computing apparatus comprises a wireless mobile device.

3. The method of claim 1, wherein the audio digital data was received at the computing device in a compressed form.

4. The method of claim 1, wherein the act of receiving the audio digital data from the handheld computing apparatus comprises receiving the audio digital data via a wireless network.

5. The method of claim 1, wherein the act of receiving the audio digital data from the handheld computing apparatus comprises receiving the audio digital data via a cellular network or a wireless local area network.

6. The method of claim 1, further comprising transmitting, by the computing device, to the handheld computing apparatus, status information relating to the computing device.

7. The method of claim 6, wherein the status information comprises a status of the computing device, or of a task.

8. The method of claim 1, wherein the voice command correlates to a computing device action, and wherein executing the set of instructions by the computing device results in communication of information to the handheld computing apparatus.

9. The method of claim 1, wherein the voice command correlates to a handheld computing apparatus action, and wherein the set of instructions is configured to cause modification of one or more settings for at least one hardware resource on the handheld computing apparatus.

10. The method of claim 1, wherein the voice command correlates to a handheld computing apparatus action, and wherein the set of instructions is configured to cause implementation of an editing function on the handheld computing apparatus.

11. The method of claim 1, wherein the voice command correlates to a handheld computing apparatus action, and wherein the set of instructions is configured to cause implementation of a navigation function on the handheld computing apparatus.

12. The method of claim 1, wherein the voice command correlates to a handheld computing apparatus action, and wherein the set of instructions is configured to cause execution of a task on the handheld computing apparatus.

13. The method of claim 1, wherein the voice command correlates to a handheld computing apparatus action, and wherein the set of instructions is configured to cause execution of a task on the handheld computing apparatus, the task comprising an operation selected from a group consisting of editing, sending, deleting, opening, saving, selecting, copying, pasting, and moving text or a message.

14. The method of claim 1, wherein the voice command correlates to a handheld computing apparatus action, and wherein the set of instructions results in modification of a view in a display on the handheld computing apparatus.

15. The method of claim 1, wherein the voice command correlates to a handheld computing apparatus action, and wherein the set of instructions is configured to cause displaying alternative options to a user of the handheld device.

16. The method of claim 1, wherein the voice command correlates to a handheld computing apparatus action, and wherein the set of instructions is configured to cause the handheld device navigating to a predetermined address or location.

17. At least one computer-readable storage device having encoded thereon instructions which, when executed by at least one processor, perform a method for implementation of voice command recognition, the method comprising acts of:
- a computing device receiving, from a handheld computing apparatus separately situated from the computing device, audio digital data representing an audio signal;
- the computing device processing the audio digital data and matching the audio digital data to a voice command from a plurality of possible voice commands, wherein the plurality of possible voice commands comprises a first plurality of voice commands correlating to computing device actions and a second plurality of voice commands correlating to handheld computing apparatus actions;
- the computing device determining whether the voice command recognized by the computing device from the audio digital data correlates to a computing device action or a handheld computing apparatus action;
- in response to determining that the voice command correlates to a handheld computing apparatus action, the computing device transmitting, via at least one network, a set of computer readable instructions indicative of the voice command recognized from the audio digital data to the handheld computing apparatus for execution by the handheld computing apparatus, wherein the set of computer readable instructions is different from a transcription of the audio digital data; and
- in response to determining that the voice command correlates to a computing device action, the computing device executing the set of computer readable instructions.

18. The least one computer-readable storage device of claim 17, wherein the method further comprises, in addition to the audio digital data, the computing device receiving from the handheld computing apparatus information indicative of a status of the handheld computing apparatus.

19. A system for implementing voice command recognition, the system comprising a computing device having at least one processor programmed to:
- receive, from a handheld computing apparatus separately situated from the computing device, audio digital data representing an audio signal;
- process the audio digital data and match the audio digital data to a voice command from a plurality of possible voice commands, wherein the plurality of possible voice commands comprises a first plurality of voice commands correlating to computing device actions and a second plurality of voice commands correlating to handheld computing apparatus actions;
- determine whether the voice command recognized by the computing device from the audio digital data correlates to a computing device action or a handheld computing apparatus action;
- in response to determining that the voice command correlates to a handheld computing apparatus action, transmit, via at least one network, a set of computer readable instructions indicative of the voice command recognized from the audio digital data to the handheld computing apparatus for execution by the handheld computing apparatus, wherein the set of computer readable instructions is different from a transcription of the audio digital data; and
- in response to determining that the voice command correlates to a computing device action, execute the set of computer readable instructions.

* * * * *